Nov. 15, 1960 S. E. SUMMERS 2,960,096
PRELOADED RUPTURABLE-DISC RELIEF VALVE
Filed Aug. 24, 1959

INVENTOR.
STANLEY E. SUMMERS
BY
Miketta and Glenny
ATTORNEYS.

United States Patent Office

2,960,096
Patented Nov. 15, 1960

2,960,096

PRELOADED RUPTURABLE-DISC RELIEF VALVE

Stanley E. Summers, Woodland Hills, Calif., assignor to Aqualite Corporation, Santa Monica, Calif., a corporation of California Filed Aug. 24, 1959, Ser. No. 835,474

4 Claims. (Cl. 137—69)

This invention relates to a preloaded rupturable-disc relief valve for use with either compressible or incompressible fluids, and in particular to such a valve capable of preventing overpressure in an incompressible fluid container or line without loss of total pressure of the incompressible fluid.

It is known that relief valves may be provided with rupturable discs which burst or rupture when the fluid reaches a predetermined blow pressure. However, rupturable-disc relief valves have many disadvantages. The rupturable disc is generally located within a valve so that the pressurized fluid is in contact with elements of the valve. When the fluid is corrosive, the valve elements deteriorate if the fluid does not become overpressurized for a sufficient time. Also, after the rupturable disc has burst and the pressure of the fluid has returned to normal, a movable valve element may be prevented from being properly reseated due to interference from the ragged edges of the disc. This may allow the remaining fluid to leak out and be either totally or partially lost. In addition, heretofore, the yielding or bursting strength of the generally metallic rupturable disc largely governed the pressure at which the valve would blow. As each disc varied slightly in thickness and physical properties, it was very difficult to obtain a standard or predictable bursting point. Therefore, allowances were made for this condition and these types of valves were only accurate to within ±20% over a temperature range of −250° F. to +120° F. of the preset blow pressure or the blow pressure of the fluid. Furthermore, where preloading was used, the metallic disc had to have sufficient strength to withstand the force of the preload.

The present invention obviates all of the disadvantages described hereinabove for rupturable-disc relief valves. The rupturable disc in the present valves is only utilized as a seal to prevent the pressurized fluid from contacting the valve elements before a rupture. This eliminates any possibility of corrosion or deterioration of the valve elements before a rupture, eliminates dependence upon tensile strength of the disc and results in other advantageous results.

The rupturable sealing disc has an unsupported rupturable strength substantially less than the blow pressure of the fluid. And for all practical purposes, the rupture strength of the sealing disc can be ignored in presetting the valve. A preloaded piston assembly supports the sealing disc and prevents it from rupturing. Therefore, greater accuracy is obtainable for the bursting pressures of the present valve, as only a single spring means is required to be adjusted and considered in presetting the valve.

In addition, a novel slidable valve assembly is provided in the valve for quickly and effectively reclosing the valve and preventing total loss of pressure and fluid after the sealing disc has ruptured and the pressure of the fluid has dropped below the blow point. The valve assembly automatically recloses the valve without interference from the fragments or ragged edges of the sealing disc which remain after the disc has been ruptured. Moreover, the slidable valve assembly of the present invention has an additional feature which provides greater flexibility than similar type relief valves. The preloaded slidable valve assembly can be easily modified so that a small quantity of incompressible fluid can be trapped after the sealing disc is ruptured, thus lowering the pressure below the critical point in the supply system, but preventing any loss of fluid to the atmosphere. However, if the pressure of the fluid increases to a second critical point, the valve assembly will open and discharge the fluid through the outlet of the valve. The valve assembly may be preset at a second blow or actuating pressure which is the same as or greater than the original pressure required to rupture the sealing disc.

Accordingly it is a general object of the present invention to provide a preloaded rupturable-disc relief that avoids all of the foregoing disadvantages of valves of similar type used heretofore.

A more specific object of this invention is to provide a relief valve which can be more accurately preset to blow at a predetermined actuating pressure than heretofore.

Another object is to provide a rupturable-disc relief valve which is capable of completely reclosing after the disc has been ruptured and the pressure has fallen below the rupturable actuating pressure without interference from fragments and ragged edges from the ruptured disc.

A further object is to provide a rupturable-disc relief valve capable of having its disc ruptured at a first blow pressure and trapping a small quantity of incompressible fluid to lower the pressure, but preventing loss of any fluid. At a second blow pressure (same as or higher than the first blow pressure) the valve will open and discharge fluid to the atmosphere.

Additional objects are to provide a rupturable-disc relief valve capable of operating over a wide temperature range and with high pressure fluids, to permit the use of relatively weak plastic composition discs and to provide a new mode of control and operation.

Other objects and advantages of this invention will be readily apparent from the following description when considered in connection with the appended claims.

Figure 1:
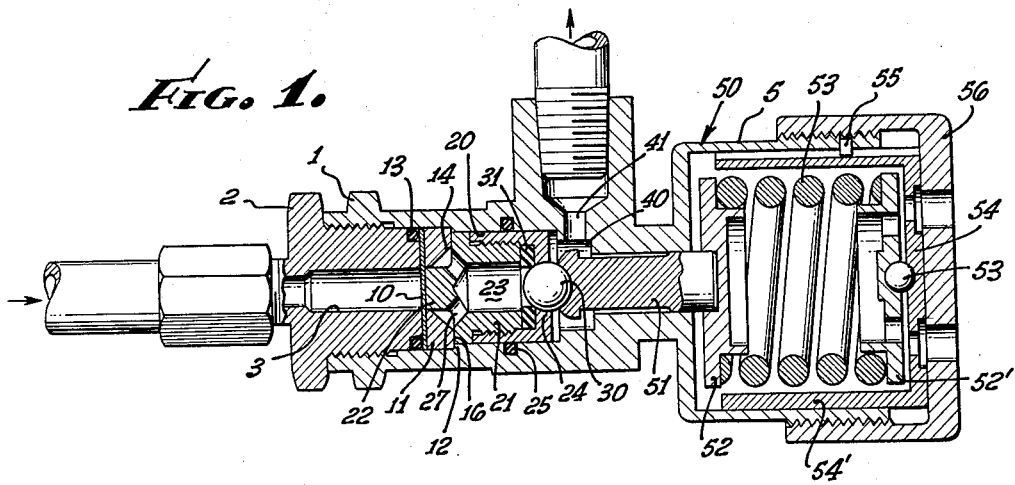
Fig. 1 is a longitudinal section of an exemplary embodiment of the present invention with the valve in a closed position.
Figure 2:
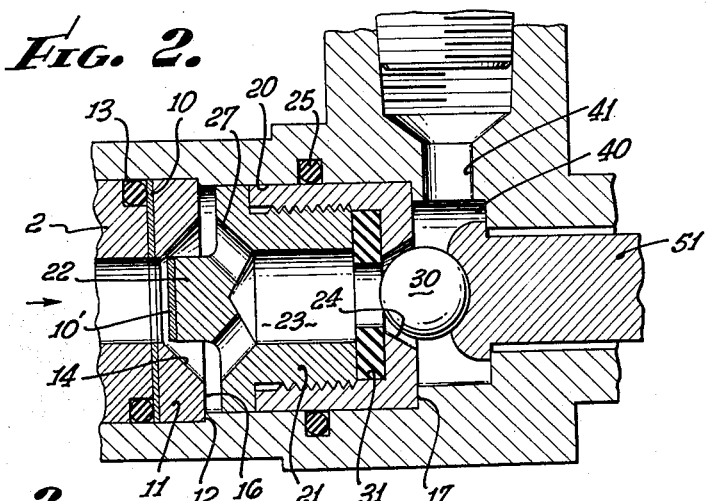
Fig. 2 is a enlarged and partial longitudinal section of the valve shown in Fig. 1 after the disc has been ruptured and the valve is in a fully open position.

In the embodiment of this invention illustrated in Figs. 1 and 2, the device is shown as comprising a housing generally indicated at 1, the housing having threadedly connected thereto a connection fitting 2 connected with the high pressure fluid system which is to be controlled, the high pressure fluid in such system being in communication with the high pressure fluid inlet chamber having the walls 3. This chamber is normally separated from the rest of the device by the burstable or flangible disc 10. The device includes an intermediate chamber defined by the cylindrical wall 20 and such intermediate chamber is in communication with an outlet chamber 40 having the outlet port 41. The device also includes a preloading portion or chamber indicated generally at 50.

The rupturable disc 10 is held transversely of the device and by means of a ring member 11 abutting a shoulder 12 formed in the bore of the housing and the connection fitting 2. Fluid sealing means such as an O-ring 13 may be provided for insuring a proper seal. It may be noted that the diameter of the high pressure inlet chamber 3 is smaller than the diameter of the intermediate chamber 20.

The ring 11 is provided with a bore adjacent the disc 10 which is preferably identical to the diameter of the bore of the high pressure chamber 3 and is then provided with an outwardly and downstream directed flaring or conical face 14.

Movably positioned within the intermediate chamber 20 is a hollow valve generally indicated by the numeral 21, such hollow valve including a piston head portion 22 and an internal surge chamber 23 as well as a downstream directed discharge port 24. The piston 22 snugly and slidably fits into the bore of the ring 11 and has an end face adapted to virtually or substantially contact the unsupported area of the disc 10. Means are provided for limiting axial or longitudinal travel of the element or valve 21 within the intermediate chamber; such means may comprise downstream facing end faces 16 of the ring 11 and an upstream facing shoulder 17 formed in the housing and indicating the rear end of the intermediate chamber 20. The valve 21 is so arranged that when it is at its extreme position towards the disc 10 the valve will contact the stop shoulder 16 of the ring, and in such position the end of piston 22 is in substantial contact with the disc 10.

Fluid seal means are provided between the valve 21 and the wall of intermediate chamber 20 such as the O-rings 25, such fluid seal means being effective in all positions of the valve.

Passageways such as 27 are provided adjacent the piston 22 for the purpose of communicating with the internal surge chamber 23. The discharge port 24 may be suitably ground so as to receive and furnish a seat for a valve ball 30. It may be noted that in the illustrative example the valve 21 is made of two portions threadedly connected together, the two portions holding a ring 31 which may be of organic plastic composition or other somewhat resilient material, such ring cooperating with the seat 24 of the discharge port to produce a tight, leaf-fitting seat for the valve ball 30.

Preload applying means for applying a predetermined preload or force to the piston head may be employed and the construction used may vary greatly. In the embodiment illustrated the thrust or preload is applied to the ball 30 (and transmitted thereby to the valve 21 and the piston head portion 22 thereof) by means of a slidable rod 51 preferably having a concaved end adapted to smoothly seat upon the outer portion of valve ball 30. The outer end of this rod 51 is provided with a retainer 52 against which one end of a spring 53 bears; the other end of the spring bears against an opposite retainer 52'. In order to prevent eccentric loading the retainer 52' receives the load of an adjustment cap through a centrally positioned ball 53 which also bears against a guide cap 54 having a skirt portion 54'. The skirt portion 54' may be provided with a longitudinal groove (parallel to the axis of the skirt), such groove cooperating with a fixed pin 55 carried by the cup shaped housing portion 5. The external surface of the housing portion 5 is provided with threads which are engaged by a regulating cap 56. It will be evident that by turning the cap 56 the inner guide 54 will be moved axially and the spring 53 subjected to compression. The compressive force of the spring will be transmitted by means of retainer 52 to the rod 51 and by such rod to the ball 30, to the hollow valve 21 and piston 22 carried thereby. The total preload thus formed and transmitted will not be applied directly to the disc 10, however, in view of the means 16 for limiting travel of the valve 21. As a result the device may be very carefully adjusted and the disc 10 will not be subjected to a pressure as great as it will encounter in actual use, during assembly and shipment. After the spring has been preloaded to the desired point, the cap 56 may be locked or sealed in place.

Since the disc 10 is not subjected to the total actuating pressure nor to the total preload, it need not be made of stainless steel, beryllium copper or other metal having very high tensile strength. Instead the disc 10 may be made of a relatively brittle material, best adapted to resist the corrosive action of whatever fluid is being controlled by the system. For example, the burstable disc 10 may be made of phenol-aldehyde compositions, phenol-urea compositions, organo-silico fluorides and other synthetic organic or metallo-organic compositions.

The operation of the device will be readily apparent. In the event fluid pressure within the system being controlled exceeds the critical or actuating pressure established by the preloading device 50, the central or unsupported portion of disc 10 (which has been in substantial contact with piston 22 and has been under compression) will be sheared and the entire hollow valve 21 will move towards the right or discharge chamber 40. In the event the system contained an incompressible fluid, such fluid will pass through the opening created by the ruptured disc into the valve chamber 20 and through passageways 27 into the surge chamber 23. The volume of fluid thus permitted to escape from the high pressure system may be sufficient to lower the pressure in such system sufficiently so as to permit the ball 30 to still remain seated upon the discharge port 24 of valve 21. In other words, the critical pressure in the system being controlled has been reduced, but no fluid will escape into the outlet chamber 40 or through the discharge port 41. If, however, the pressure continues to rise or in the event the fluid in the system being controlled is of a compressible nature and continues to rise in pressure, then the ball 30 will be unseated against the load of the spring 53 and fluid will be permitted to escape into the outlet chamber 40 and through outlet port 41. As soon as the pressure has been thus relieved, the preloading spring will again close the ball valve 30 even though the disc has been ruptured. The system will be under control since as long as the ball valve 30 is seated no additional fluid can escape from the system.

Fig. 2 illustrates an extreme position of the device of the present invention wherein both the disc has been ruptured and the ball valve unseated.

It should be noted that the slidable valve 21 allows wide flexibility in determining at what pressure the valve ball 30 will be opened. As the valve 21 moves rearwardly against the shoulder 17, the ball 30 and rod 51 also moves downstream. This increases the loading on the spring 53 and dependent upon the relationship of the area of the valve ball 30 to the area of the piston portion 22 there may be required a first critical pressure at which the piston portion 22 will be moved and a second higher critical pressure at which the valve ball element 30 may be moved. If the areas of the piston portion 22 and the ball 30 are equal, a higher fluid pressure will be required to open the ball 30 than was required for the piston portion 22 to open. This is due to the valve 21 being moved downstream and causing the spring 53 to be further loaded. However the valve could be designed so that the area of the ball 30 in the discharge port 24 would be less than the area of the piston portion 22, and therefore even if the spring 53 would be further loaded when the valve 21 is moved downstream, the ball 30 would open at the same pressure as the piston portion 22. It can therefore be seen that dependent upon the conditions and the requirements for each job, the ball 30 can be caused to open at a higher critical pressure than the piston portion 22 or at the same critical pressure. Therefore, great flexibility is afforded to the present valve due to the arrangement of the novel slidable valve 21.

Figure 3:
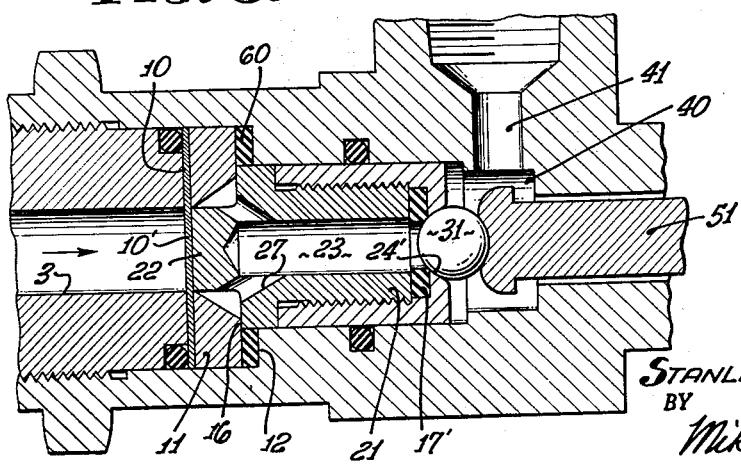
Fig. 3 is a longitudinal section of another embodiment of the valve.

Another means of causing the ball valve 30 to open at a different critical pressure than the piston portion 22 is to vary the stroke or length of travel of the valve 21. Fig. 3 is a modification of the present invention and discloses means for varying the length of travel of the valve 21 thus causing the load to increase on the spring as valve 21 is forced downstream after the sealing disc 10 has been ruptured. As shown in Fig. 3, a spacer member 60 may be provided between the annular shoulder 12 and the annular ring 11. This spaces the ring 12 and sealing disc 10 a greater distance from the shoulder 17 causing the valve 21 to travel a greater distance before engaging the shoulder 17. Therefore, since the length of travel or the stroke of the valve 21 is now greater, the loading on the spring 53 will also be greater when the valve 21 comes to rest at the shoulder 17. This increased loading of the spring 53 will require a higher critical pressure to open ball valve 30 than is required to rupture the unsupported disc portion 10' and open the piston portion 22.

Fig. 3 also shows a discharge port 24' of the slidable valve 21 which is smaller in diameter than the diameter of the inlet 3 and the diameter of the piston portion 22. It is therefore understood that the diameters of the inlet 3, piston portion 22 and the outlet port 24' may be varied to also cause the ball valve 30 to open at the same or at a higher critical fluid pressure than the piston portion 22.

By providing the sealing disc at the inlet end of the valve, the movable valve elements are prevented from becoming corroded or deteriorating from corrosive or other damaging fluids. The ball valve will always completely reseat within the discharge port 24 after the critical pressure has been relieved and prevents total loss of fluid or any leakage of fluid. This is in distinction to valves used heretofore where the movable valve element was required to close the opening which was surrounded by the fragments or portions of the ragged edges of the rupturable disc. In the present valve the piston portion 22 is adapted to close the inlet 3 and the ball valve 30 will ensure against any leakage by closing within the port 24. As the ball valve 30 and the valve assembly are preferably made of metal, a very effective seal will be provided as the ball will engage the inclined surfaces of the port 24 as well as contacting the resilient sealing ring 31. It has been found that other high pressure rupturable-disc relief valves have leaked after they have been ruptured or the sealing disc broken by as much as 300 to 600 p.s.i. from the closing pressure. The ball valve element of the present invention has been bubble-tested and completely reseals within 25 p.s.i. of the closing pressure. It has also been found that other similar type valves used heretofore have only an accuracy of ±20% of the critical fluid pressure at which the sealing disc will rupture. The present valve has an accuracy of ±5% which is a considerable improvement over valve used heretofore. It has been found that the present valve will effectively operate with high fluid pressures on the order of 4000 p.s.i. to 7000 p.s.i. and over a temperature range from −250° F. to +120° F. This valve is particularly applicable to lower temperature or cryogenic uses.

It can therefore be easily understood by one skilled in the art that the present invention offers many improvements and advantages over other rupturable-disc relief valves whether used with compressible or incompressible fluids. It has greater accuracy, completely reseats after rupturing, and prevents total loss of fluid.

Obviously many modifications and variations of the present invention are possible in the light of the above teachings. It is therefore to be understood that within the scope of the appended claims the invention may be practiced otherwise than as specifically described.

I claim:

1. In a relief valve of the rupturable disc type including a housing having a high pressure inlet and rupturable disc held across such inlet and an outlet chamber provided with an outlet port, the provision of: a valve chamber between said rupturable disc and the outlet chamber; a hollow valve movably positioned within said valve chamber; means for limiting the travel of said hollow valve within said valve chamber; fluid seal means between said valve and valve chamber effective in all positions of said valve; said hollow valve including a piston head; an internal surge chamber, passageways adjacent said head in communication with said surge chamber and a discharge port from said surge chamber; a valve ball normally seated on said discharge port; means for applying a predetermiend load to said movable hollow valve in the direction of the disc; said travel limiting means preventing the total predetermined load from being applied to the surface of the rupturable disc when the pressure in the high pressure inlet is less than the predetermined load, said movable valve comprises a piston head portion and a discharge port portion, said portions being threadedly connected, and a resilient seating ring held by said portions and cooperating with said discharge port to provide a seat for the valve ball.

2. In a relief valve of the rupturable disc type including a housing having a high pressure inlet and a rupturable disc held across such inlet and an outlet chamber provided with an outlet port, the provision of: a valve chamber between said rupturable disc and the outlet chamber; a hollow valve movably positioned within said valve chamber; means for limiting the travel of said hollow valve within said valve chamber; fluid seal means between said valve and valve chamber effective in all positions of said valve; said hollow valve including a piston head; an internal surge chamber, passageways adjacent said head in communication with said surge chamber and a discharge port from said surge chamber; a valve ball normally seated on said discharge port; means for applying a predetermined load to said movable hollow valve in the direction of the disc; said travel limiting means preventing the total predetermined load from being applied to the surface of the rupturable disc when the pressure in the high pressure inlet is less than the predetermined load, and including as a means for holding the rupturable disc, a ring having an axial bore substantially equal in diameter to the diameter of the piston head, and a downstream flaring conical portion, the preload applying means including a rod having a concave end adapted to seat upon the valve ball.

3. In a relief valve of the rupturable disc type including a housing having a high pressure inlet and a rupturable disc held across such inlet and an outlet chamber provided with an outlet port, the provision of: a valve chamber between said rupturable disc and the outlet chamber; a hollow valve movably positioned within said chamber; a hollow valve movably positioned within said valve chamber; means for limiting the travel of said hollow valve within said valve chamber; fluid seal means between said valve and valve chamber effective in all positions of said valve; said hollow valve including a piston head; an internal surge chamber, passageways adjacent said head in communication with said surge chamber and a discharge port from said surge chamber; a valve ball normally seated on said discharge port; means for applying a predetermined load to said movable hollow valve in the direction of the disc; said travel limiting means preventing the total predetermined load from being applied to the surface of the rupturable disc when the pressure in the high pressure inlet is less than the predetermined load, and means for varying the length of travel of said hollow valve when the disc is ruptured.

4. A relief valve as stated in claim 3 wherein said last mentioned means includes a spacer member cooperating with said travel limiting means for varying the distance between said travel limiting means and the outlet chamber.

References Cited in the file of this patent

UNITED STATES PATENTS

| | | |
|---|---|---|
| 1,779,056 | Till | Oct. 21, 1930 |
| 1,779,065 | Grant | Oct. 21, 1930 |
| 2,335,829 | McBride | Nov. 30, 1943 |
| 2,487,104 | Cooper | Nov. 8, 1949 |

FOREIGN PATENTS

| | | |
|---|---|---|
| 264,996 | Switzerland | Feb. 16, 1950 |